United States Patent [19]

Vargo

[11] Patent Number: 4,811,186
[45] Date of Patent: Mar. 7, 1989

[54] HIGH FREQUENCY-HIGH VOLTAGE POWER CONVERTER CIRCUIT

[76] Inventor: Frank J. Vargo, 5620 SW. Third Ct., Plantation, Fla. 33317

[21] Appl. No.: 160,381

[22] Filed: Feb. 25, 1988

Related U.S. Application Data

[63] Continuation-in-part of Ser. No. 42,973, Apr. 22, 1987, Pat. No. 4,734,828.

[51] Int. Cl.[4] .............................................. H02M 3/335
[52] U.S. Cl. ...................................... 363/22; 363/133; 315/DIG. 7
[58] Field of Search ......................... 363/22, 23, 24, 25, 363/26, 97, 133, 134, 132; 323/DIG. 2, DIG. 5, DIG. 7

[56] References Cited

U.S. PATENT DOCUMENTS

| | | | |
|---|---|---|---|
| 4,070,701 | 1/1978 | Harnden, Jr. et al. | 363/134 |
| 4,150,424 | 4/1979 | Nvechterlein | 363/26 |
| 4,358,716 | 11/1982 | Cordes et al. | 363/134 |
| 4,628,426 | 12/1986 | Steigerwald | 363/26 |
| 4,651,271 | 3/1987 | Grace | 363/132 |
| 4,667,132 | 5/1987 | Leale | 315/DIG. 7 |

Primary Examiner—Peter S. Wong
Attorney, Agent, or Firm—Flehr, Hohbach, Test, Albritton & Herbert

[57] ABSTRACT

A power supply for an inert gas lamp which enables automatically changing the portion of the lamp which is lit in accordance with a predefined pattern. The power supply includes an a.c. to d.c. conversion circuit, and a high frequency-high voltage transformation circuit with an input coupled to the conversion circuit and an output to be coupled to an inert gas lamp. A control or function module controls and automatically changes the voltage supplied to the transformation circuit, in accordance with a predefined pattern, and thereby causes the portion of the lamp which is lit to change in accordance with that pattern. The transformation circuit and the control module are arranged so that the portion of the lamp which is lit can be smoothly and controllably varied from zero to 100 percent of the length of the lamp.

10 Claims, 4 Drawing Sheets

HIGH FREQUENCY-HIGH VOLTAGE POWER CONVERTER CIRCUIT

This application is a continuation in part of application Ser. No. 07/042,973, filed Apr. 22, 1987, entitled HIGH FREQUENCY-HIGH VOLTAGE POWER CONVERTER CIRCUIT in the name of Frank Vargo, now U.S. Pat. No. 4,734,828.

The present invention relates to a power module or power source for an inert gas lamp and particularly relates to a power converter capable of automatically adjusting the portion of an elongated inert gas bulb which is lit so as to produce the visual effect that the ignited gas is flowing through the bulb, or that the bulb is being dynamically written or painted.

BACKGROUND OF THE INVENTION

Inert gas lamps, such as the neon lamps used in many small signs, displays and advertisements require a power supply which provides sufficient voltage in a pulsed or switched mode to activate the gas in the lamp.

A typical sign or display has a light skeleton-like, metal frame that holds the inert gas tubing in place. The prior art devices generally use a large, heavy, 60-cycle, high voltage transformer mounted at the bottom of the sign. A typical sign, without the transformer, weighs approximately six pounds while the standard transformer weighs ten pounds or more.

Unfortunately, inert gas signs are generally much too fragile to support the weight of these transformer. As a consequence, a high percentage of signs arrive at their shipping destination with broken lamp tubing. Additional packing material placed around the transformer does not completely alleviate this shipping and handling problem.

The present invention is a power supply for inert gas lamps which is substantially smaller and lighter weight than the prior art power supplies for neon lamps. The new power supply achieves its lower weight by using switching frequencies of at least 25 KHz and a relatively small, loosely coupled output transformer. The power supply's output transformer also has a high Q factor during open circuit conditions, allowing a relatively small transformer to produce the high voltages required for initial ignition of a cold cathode inert gas lamp.

A surprising benefit of the circuit arrangement used in the present invention is that it enables ignition or activation of the inert gas in the lamp with a relatively low input voltage, and complete control over the portion of the lamp or bulb which is activated or lit. By varying the input voltage into the power supply, the portion of the bulb which is lit can be smoothly and controllably varied from zero to 100 percent of the bulb—creating the visual effect that activated gas is flowing through the lamp.

The present invention also includes a control module or visual display function controller which can automatically control and adjust the portion of the bulb which is lit. The portion of the bulb that is lit can therefore be automatically adjusted over time to any point between zero and 100 percent, and this feature can be used with neon bulbs of any length that can be powered by conventional neon bulb power supplies.

It is therefore an object of the present invention to provide a power module for inert gas lamps which is usually small and light weight, and which activates the lamp using high frequency—high voltage electrical power.

Another object of the present invention is to provide a power module for an inert gas lamp, the power module having an output power level which is adjustable so that the portion of the lamp which is lit can be smoothly and controllably varied from zero to 100 percent of the lamp.

SUMMARY OF THE INVENTION

In summary, the present invention is a power supply for an inert gas lamp. A conversion circuit, coupled to an a.c. power supply, provides substantially d.c. power. A high frequency—high voltage transformation circuit has an input coupled to the conversion circuit and an output to be coupled to an inert gas lamp, the magnitude of the voltage corresponding to the voltage supplied by the conversion provided to the inert gas lamp circuit.

The transformation circuit includes an output transformer having a primary winding with a center tap coupled to the d.c. output of the conversion circuit and a secondary winding that is to be coupled to the inert gas lamp, and switching means coupled to the d.c. output of the conversion circuit for supplying an alternating current to the primary winding of the output transformer. The alternating current varies in polarity at a frequency of at least 30 kilohertz.

Generally, the output transformer is sized so that its weight is substantially less than the weight of a transformer for directly transforming a 60 hertz a.c. power supply to produce similar output voltage and power levels as this power supply.

Further, the power supply includes a voltage level control circuit that controls the voltage level of the d.c. output supplied to the transformation circuit. The portion of the lamp which is lit is controlled by the output voltage from the voltage level control circuit. The transformation circuit is arranged so that when powering the lamp up from a state in which it is off by increasing the output voltage from the voltage level control circuit, the a.c. voltage level output by the transformation circuit automatically decreases when the lamp is initially lit. As a result, the portion of the bulb which is lit can be smoothly and controllably varied from zero to 100 percent of the length of the lamp.

BRIEF DESCRIPTION OF THE DRAWINGS

Further objects and advantages of the present invention can be found in the following description of the preferred embodiments thereof when taken in conjunction with the accompanying drawings in which.

DETAILED DESCRIPTION OF THE PREFERRED EMBODIMENTS

Figure 1:
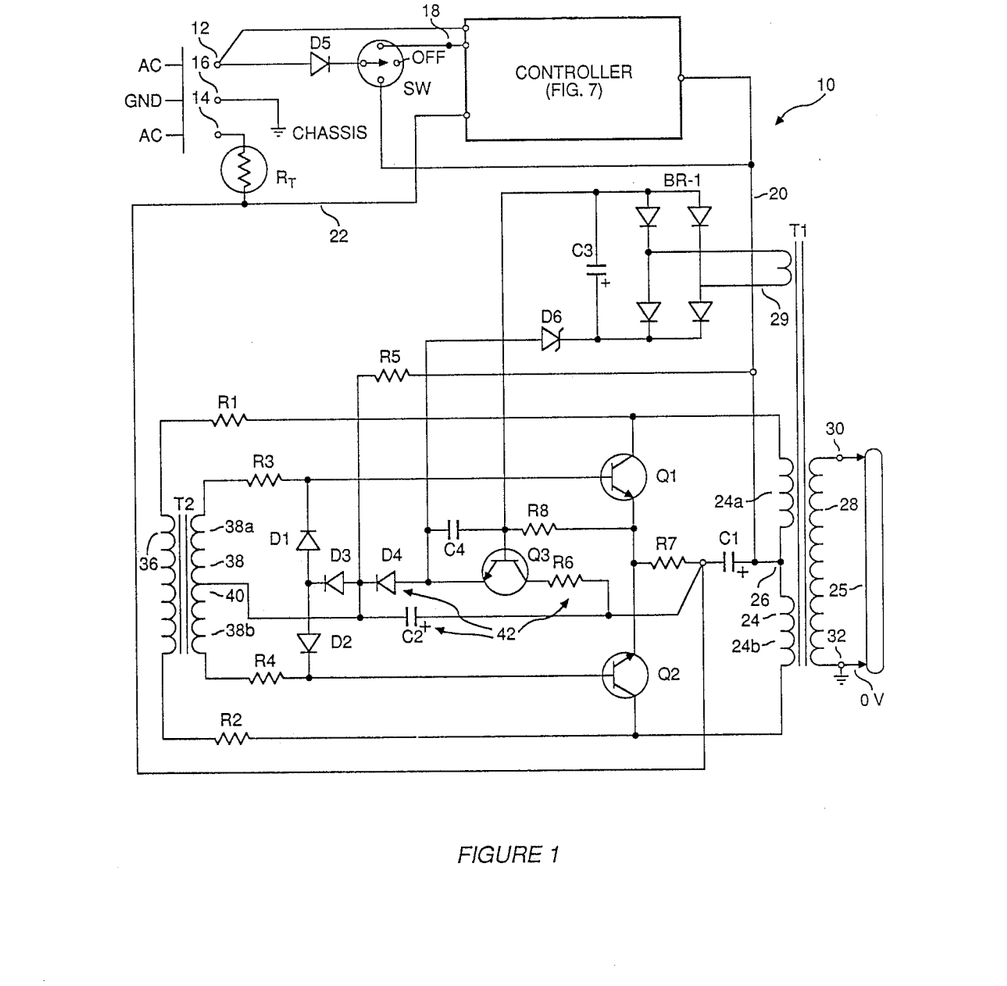
FIG. 1 shows the electrical schematic of a high frequency-high voltage power supply circuit in accordance with the principles of the present invention.

FIG. 1 ahows the preferred embodiment of a power supply 10 for an inert gas lamp 25. Input terminals 12 and 14 receive conventional, 60 cycle, a.c. electrical power, and terminal 16 is connected to earth ground and the chassis of the power supply.

Two Operating Modes. Switch SW controls the operation of the circuit by connecting the cathode of diode D5 to either node 20 or to node 18 at the input to a control module 21. In addition, switch SW has an OFF position for disconnecting the power supply 10 and its inert gas lamp 25 from the a.c. power source. When switch SW connects the cathode of diode D5 to node 20, the full power of the power supply circuit 10 is applied to the power supply 10, and the inert gas lamp 25 is fully lit—assuming that the power supply 10 has been properly sized for the lamp 25.

When switch SW connects the cathode of diode D5 to node 18 at the input to the control module 21, the power supply operates in a "SIGNWRITER" mode in which the control module 21 controls the portion of the lamp 25 which is lit. The operation of the control module is explained in detail below, with reference to FIG. 7.

The following description of the basic operation of the power supply 10 assumes that switch SW is coupling the cathode of diode D5 to node 20.

A.C. to D.C. Conversion. A half-wave rectifier D5-C1-$R_T$ converts a.c. power from an external a.c. power source into substantially direct current. The half-wave rectifier, formed by diode D5, capacitor C1 and resistor $R_T$, is connected in a serial fashion across input terminals 12 and 14.

In this embodiment, resistor $R_T$ is a thermistor which has a negative temperature coefficient. That is, the resistance of the thermistor is inversely proportional to its temperature. Thermistor $R_T$ provides current limiting protection for power module 10 during the initial start up of circuit by preventing a current surge from damaging the circuitry. During operation, the resistance of thermistor $R_T$ is reduced due to its negative temperature coefficient characteristic.

Figures 2, 3, 4A, 4B:
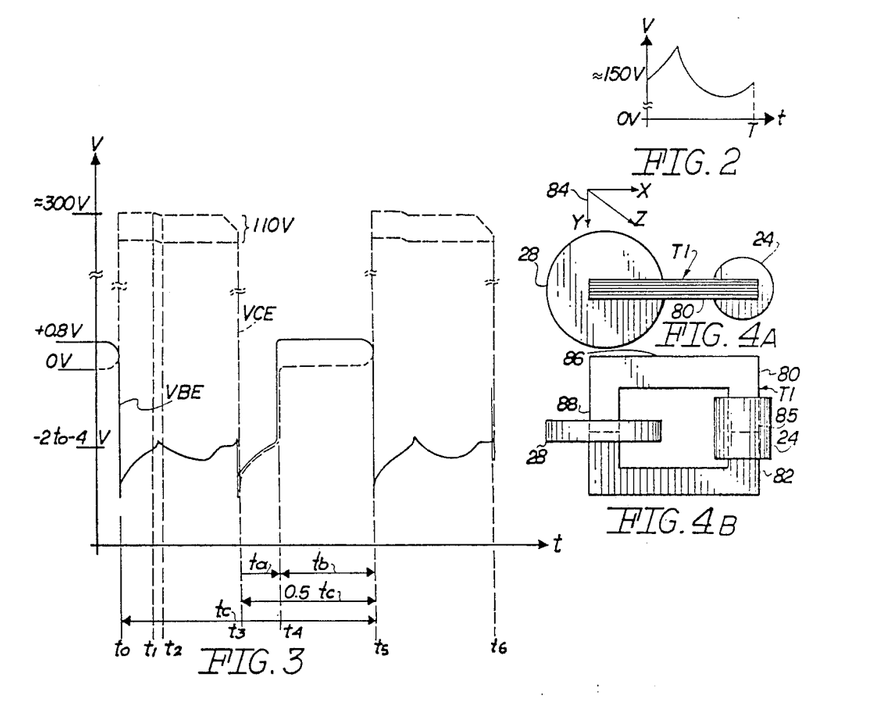
FIG. 2 shows a wave form as the substantially direct current obtained from the circuit shown in FIG. 1.
FIG. 3 shows a timing diagram for one of the pair of switching transistors in FIG. 1.
FIGS. 4A and 4B are plan views of the top and side view, respectively, of the output transformer utilized in one embodiment of the circuit shown in FIG. 1.

FIG. 2 shows the operation of the half-wave rectifier with a 60 Hz, 120 VAC input. The wave form shown in FIG. 2 represents the voltage across capacitor C1 (i.e., the difference between the voltages on nodes 20 and 22). Approximately one cycle T (i.e., 1/60 second) is shown, which corresponds to the frequency of the a.c. electrical power applied to input terminals 12 and 14. The average voltage at node 20 (relative to the voltage on node 22) is approximately 150 volts under the conditions shown.

Figure 5:
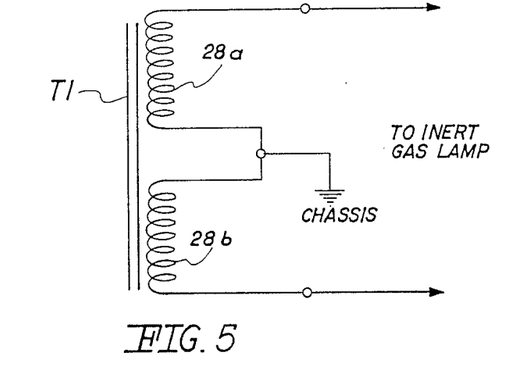
FIG. 5 shows an alternative secondary winding for the output transformer of the power supply shown in FIG. 1.

Transformer Design. Power module 10 includes two transformers, a ferrite core output transformer T1 and a saturable core transformer T2. Output transformer T1 has its primary winding 24 divided into winding segments 24a and 24b by center tap 26 disposed at the electrical center of the primary winding. The primary consists of a dual winding, on a coil tube, which is bifilar wound to produce identical characteristics and maximum coupling between the two winding segments. Secondary winding 28 of transformer T1 is connected in this embodiment to an inert gas lamp via output terminals 30 and 32. Secondary winding 28 of transformer T1 may be either a single pi winding, with one end connected to ground terminal 16 (see FIG. 1) or for higher output voltage, a dual pi winding with its electrical center connected to ground terminal 16 (see FIG. 5). All pi windings are wound in a universal or lattice pattern to ensure proper operation at high frequency. In the preferred embodiment, the resulting secondary winding 28 of the output transformer T1 has a relatively high Q factor, equal to approximately 2.8, which enables the output transformer T1 to generate a high output voltage for initially activating the bulb 25.

The term "end", as in "the end of a winding" and particularly the end of one of the split windings, is herein defined as that end which is opposite the center tap. For example, an end of primary winding 24 is the end of the winding segment 24a opposite center tap 26. Likewise, the end of winding segment 38a for transformer T2 is that end of the segment opposite from center tap 40.

FIGS. 4A and 4B respectively show detailed, plan views of the side and the top of output transformer T1. The T1 transformer's ferrite core is formed from two "C" shaped portions 80 and 82. Table I that follows provides the dimensions for one-half or a "C" portion of the ferrite core for the output transformer.

TABLE I

|  | U core #1F19 | Stackpole #50-0386 |
|---|---|---|
| Height | 2.543 | 2.476 |
| Width | 0.545 | 0.545 |
| Height of Arm | 0.545 | 0.515 |
| Length of Arm | 0.703 | 0.703 |
| Length of Vertical Leg | 0.453 | 0.453 |
| Space between Arms | 1.457 | 1.455 |

FIG. 4B shows "C" shaped core portion 80 having the extensive end 85 of an arm adjacent the extensive end of another arm of core section 82. The height of the "C" section 80 is given in Table I as the dimension along axis x as shown in coordinate system 84 immediately below the plan view of transformer T1. The width is along axis z, height of the arm is along axis x, length of the arm is the extensive portion 85 of the arm and is measured from body portion 86 along the y axis, length of the vertical leg is measured along axis y for body portion 86 and the space between arms 85 and 88 is measured along axis x. While only two types of ferrite cores are shown in Table I, the design of the power module can easily accommodate other ferrite cores having similar or proportional characteristics.

The number of turns in primary winding 24 depends in part upon the maximum voltage present at circuit junction 20, the positive side of capacitor C1 in FIG. 1. The size of the wire used in the primary winding depends upon the RMS current in either primary winding segment under maximum load conditions. Hence with other factors held constant, the number of turns on primary winding 24 depends on the input voltage across input terminals 12 and 14.

Figure 6:
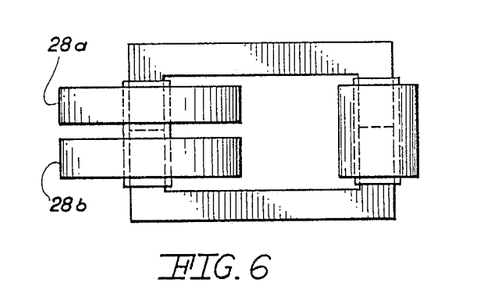
FIG. 6 is a plan view of an alternative output transformer.

The characteristics of secondary winding 28 at the other end of the assembled core depend upon the power requirements of the associated circuit coupled to output terminals 30 and 32. The number of turns in secondary winding 28 depends primarily upon the output voltage requirements of the power module and the number of turns on the primary winding. It is estimated that to obtain a 6 Kv peak output at 120 VAC input using either of the cores shown in Table I requires approximately 2500 turns on the secondary winding at a chosen operating frequency. The first preferred embodiment, shown in FIGS. 1 and 4A-4B, utilizes a single pi secondary winding 28. However, in a second preferred embodiment, shown in FIGS. 5 and 6, a two pi secondary winding 28A-28B is utilized with a grounded center tap at the electrical center of that secondary winding. This would approximately double the voltage output of the power module. It is important that the two pi windings, 28a and 28b shown in FIGS. 5 and 6, be spaced apart, as shown in FIG. 6, in order to reduce the total inductance of secondary winding 28 and allow full power to build up during each cycle.

FIG. 4A simply shows the top plan view of output transformer T1 wherein primary winding 24 and secondary winding 28 is shown on core section 80.

Push Pull Circuit. Returning to the detailed description of the electrical schematic of power module 10, each end of the primary winding 24 of the output transformer T1 is connected to a respective collector of one of the switching transistors Q1 and Q2, and is coupled to a respective end of the primary winding 36 of saturable core transformer T2 by a respective one of resisters R1 or R2.

Transformer T2 provides the dual circuit function to operate as an impedance changing device (transformer) and as a timing device (saturable inductor). It includes a ferrite core which has magnetic square loop characteristics. In the preferred embodiment, transformer T2 is a toroid with a primary 36 having 125 turns and a secondary 38 having four turns. As is well known, this turns ratio will vary depending upon the interface and voltage ratio requirements of its primary and secondary windings. In the preferred embodiment, the primary is wound almost 360 degrees around the toroid and the secondary is wound on the remaining circumferential region of the toroid.

The size of the core of transformer T2 is related to the power output of power module 10 and the current necessary to drive switching transistors Q1 and Q2. The resistance ratio of resistors R1 and R2 with respect to resistors R3 and R4 generally follows the impedance ratio of the T2 primary with respect to the T2 secondary.

All of these resistors, R1, R2, R3, and R4, provide proper isolation impedance for the voltage feedback from the primary of output transformer T1 (resistors R1 and R2) and isolation impedance from the base input circuit of each of the switching transistors Q1 and Q2 (resistors R3 and R4, respectively). By appropriately designing saturable transformer T2 and selecting the values of resistors R1, R2, R3, and R4, the basic switching frequency of the power module is determined. As in all feedback control loops, proper phasing is necessary in the connections to the primary and secondary windings of the T2 transformer.

Resistors R3 and R4 are respectively connected to either end of secondary winding 38 of transformer T2. Secondary winding 38 is divided in half by center tap 40.

Center tap 40 is connected to an RC circuit 42 that includes resistor R6, capacitor C2 and diode D4. The other end of RC circuit 42 is connected to circuit junction 22 which is the negative side of capacitor C1.

A biasing network for each of the switching transistors Q1 and Q2 sets the minimum negative base bias voltage during its normal "OFF" period of the cycle. The biasing networks include diodes D1, D3 and D4 for transistor Q1 and diodes D2, D3 and D4 for transistor Q2. The biasing network is connected to RC circuit 42 as well as being connected to the base of the respective transistor. D4 also provides the necessary DC isolation so that "start up" current, from C1(+) through R5 to either transistor, will not be shunted to C1(−) during the initial "start up" period.

The emitter of each switching transistor Q1 and Q2 is connected to the negative side of capacitor C1 via feedback resistor R7.

Resistor R5 is only utilized to provide initial "start up" current from the positive side of capacitor C1 through R5 to both of the transistor bases.

Feedback Control. In order to limit abnormally high output voltage from being generated in the secondary windings of T1, under certain abnormal operation conditions, a feedback control circuit is used. In particular, a low voltage winding 29 is placed on the secondary leg of T1, adjacent to the secondary windings 28 for high coupling, to sense secondary output voltage. The low sense voltage from the winding 29 is rectified by a bridge rectifier BR-1 and is filtered by capacitor C3. The peak voltage developed across capacitor C3 is related to the peak secondary output voltage by the turns ratio between the feedback winding 29 and the secondary winding 28.

The voltage rating of the zener diode D6 is chosen so that it starts to conduct when the secondary output voltage reaches a specified maximum peak voltage. In other words, the break-down voltage of D6 is selected so that it is equal to the voltage across capacitor C3 when the secondary output voltage reaches the specified maximum peak voltage.

Transistor Q3, placed in series with R6 and D4, is used to control the base drive current for switching transistors Q1 and Q2. Resistor R8 provides the base drive current for Q3, while capacitor C4 functions as a high frequency filter for the base-emitter junction of Q3.

Under normal operation conditions, when the secondary output voltage is within the desired limits, transistor Q3 is biased fully on by resistor R8, and current through diode D4 is limited only by the selected resistance of R6. When abnormal operation conditions exist, Q3 is driven into "cut-off" condition due to the reverse (negative) bias generated by the feedback control circuit. This action causes the converter 10 to go into a pulsating "start-stop" mode, thereby limiting the secondary output voltage to a desired value.

Circuit Operation. The operation of power module 10 will be explained in conjunction with the timing diagram illustrated in FIG. 3 that shows 1.5 cycles from time $t_0$ through time $t_6$ for one of the switching transistors. In the following discussion, transistor Q1 will be discussed in detail. It should be noted that the operation of transistor Q2 is a mirror image of the operation of transistor Q1 since the power module circuit is a balanced, push-pull converter. In other words, the operation of transistor Q2 is 180 degrees out of phase with respect to the operation of transistor Q1.

Referring concurrently to FIGS. 1 and 3, at time $t_0$, the base-emitter voltage ($V_{be}$) of transistor Q1 is negative, and in this embodiment it is more negative than the −2 to −4 volt bias level shown. The collector-emitter voltage ($V_{ce}$) is shown in dashed lines in FIG. 3. It is important to note that the ordinate scale in FIG. 3 varies significantly since the upper region of FIG. 3 is approximately 300 volts whereas the lower region in FIG. 3 (below the broken line indicators) is in the region surrounding zero volts.

At time $t_0$, the collector voltage $V_{ce}$ is very high and approaches a 340 volt peak. The upper end of the collector voltage $V_{ce}$ varies as shown in band 110 due to the change in voltage of the AC/DC voltage conversion. In other words, the substantially DC voltage varies as shown by the wave form in FIG. 2. At the peak DC voltage, the collector voltage $V_{ce}$ is in the upper end of range 110 whereas when the DC voltage is lowest, the collector voltage is in the lower end of region 110. In one embodiment, region 110 spans 60 volts. Again, it is important to note that the voltage scale in FIG. 3 changes if one is considering the lower voltages present at the base emitter junction of the switch transistor as compared to the higher voltages at the collector when the transistor is in an OFF state.

Therefore, at time $t_0$, approximately 300 volts is present at the collector of transistor Q1 when the transistor is in an OFF state. That same voltage is present at the end of the primary winding 24a of output transformer T1. The voltage at circuit junction 20 is nominally 150 volts positive. At this time, the voltage at the other end of primary winding 24, that end of winding segment 24b opposite center tap 26, is approximately zero volts or less.

Between time $t_0$ and $t_1$, $V_{ce}$ is approximately 4 to 8 volts higher than at time $t_2$ due to the excess energy remaining in the primary winding 24 of output transformer T1 when Q1 is turned OFF. Simultaneously, between $t_0$ and $t_1$, the collector voltage $V_{ce}$ of Q2, due to magnetic coupling in the primary winding of T1, is driven approximately 4 to 8 volts negative causing the collector-base n-p junction of Q2 to turn ON during this period of time. This conduction path removes the excess energy remaining in the primary winding. During the very small interval of time between $t_1$ and $t_2$, Q2 collector-base n-p junction turns OFF and the base-emitter p-n junction turns ON. This allows normal Q2 collector current to flow for the period of time between $t_2$ and $t_3$.

At time $t_3$, transformer T2 saturates and all voltages across T2 windings drop to 0 volts (or substantially 0 volts). At that time, Q2 base voltage $V_{be}$ drops to 0 volts, Q2 collector is released and its $V_{ce}$ voltage instantaneously rises to approximately 300 volts. Simultaneously, Q1 collector $V_{ce}$ voltage drops from substantially 300 volts to less than 0 volts. This switching of the collector voltages simultaneously causes the T2 primary and secondary voltages to switch, due to coupling through R1 and R2, and take T2 out of saturation. The switching action just described, would normally cause the $V_{be}$ voltage, from T2 winding 38a, to turn Q1 ON at time $t_3$. However, due to the excess energy remaining in winding 24 of output transformer T1, the Q1 collector voltage and hence the base voltage, remain below 0 volts for time span $t_a$ (between times $t_3$ and $t_4$).

This voltage pulse is filtered by capacitor C2 in the RC circuit 42. This is shown by the time constant characteristic of the base and collector voltages during interval $t_a$. The current reset pulse, during that time interval, utilizes current from the excess energy stored in winding 24 that passes through the Q1 collector-base n-p junction and through diodes D1, D3 and R-C network 42 to the negative side of capacitor C1. When the excess energy, minus losses, has been transferred to C1 and C2, the reset current stops allowing the Q1 collector-base n-p junction to turn OFF and the base-emitter p-n junction to turn ON, at time $t_4$, due to the $V_{be}$ voltage from T2 winding 38a. This $V_{be}$ voltage is shown as approximately 0.8 volts at the base-emitter p-n junction. At this time, the collector $V_{ce}$ voltage is substantially zero volts, $V_{be}$ voltage is substantially 0.8 volts, and both $V_{be}$ and $V_{ce}$ remain at these levels during time span $t_4$-$t_5$. Diodes, D1, D3 and D4 set the minimum negative bias for the base voltage $V_{be}$ during the OFF state of transistor Q1 or between times $t_0$ and $t_3$.

Interval $t_a$ is called the reset interval and interval $t_b$ (between times $t_4$ and $t_5$) sets the current pulse width for the entire switching cycle.

At time $t_5$, transformer T2 again saturates, transistor Q1 turns OFF, transistor Q2 turns ON and the collector of transistor Q1 is released so that voltage $V_{ce}$ rises to approximately 300 volts again.

By changing the value of resistor R6 in RC circuit 42, the negative bias voltage for either of the switching transistors is changed in proportion to the total current through that resistor. This total current in part consists of a short duration reset current pulse during time interval $t_a$, or $t_0$-$t_1$, which is required to reset the core of output transformer T1 immediately after each half cycle (between times $t_0$-$t_3$ or $t_3$-$t_5$). The total current also consists of the base drive current from the other winding segment of the secondary winding of transformer T2 to the other switching transistor which is in an ON state. An increase in the negative bias voltage (for example the bias voltage for transistor Q1), will reduce the base drive current (for transistor Q2) available to keep transistor Q2 ON since that current is available from winding segment 38b of transformer T2. The increase in negative bias voltage causes a reduction in the pulse width (during interval $t_b$) thereby reducing the operating power level of the power module. Therefore, resistor R6 may be used to control, within limits, the power level of the entire module.

As stated earlier, capacitor C2 functions as both a filter for the voltage pulse, which results from the current through resistor R6, and as a low impedance path (together with diodes D1, D2 and D3) for the larger, short duration reset current.

By shortening the ON time during interval $t_b$, the overall frequency of the output voltage, that is cycle time $t_c$, changes. In Table II, the cycle time $t_c$ and the switching frequency $f_{sw}$ are shown for two values of R6 (0 and 10 ohms) using switching transistors Q1 and Q2 which are Motorola transistors, Model Number MJE13005. Other suitable transistors may be used with slightly different results. In the preferred embodiment, these transistors are utilized by supplying AC power at 120 volts at input terminals 12 and 14.

TABLE II

|   | R6 = 0 | R6 = 10 ohms |
|---|---|---|
| $t_a$ | 5 microsec. | 5 microsec. |
| $t_b$ | 9 microsec. | 6.5 microsec. |
| $t_c$ | 28 microsec. | 23 microsec. |
| $f_{sw}$ | 35.71 KHz | 43.48 KHz |
| $V_{be}$ | −2 v. | −4 v. |

Feedback resistor R7 is connected to the emitters of both switching transistors Q1 and Q2. Resistor R7 utilizes the current gain characteristics of the switching transistors to provide a negative feedback which is useful for several purposes. This feedback increases the base input impedance of each transistor thereby allowing the use of resistors R3 and R4 to provide the necessary isolation impedance for transformer T2. The negative feedback tends to linearize the current through the switching transistors and reduces the need to match transistor characteristics. Further, the feedback provides some degree of current limiting for each transistor by increasing the negative bias during current surges and forcing a reduction in the pulse width or the duration of interval $t_b$.

As stated earlier, output transformer T1 utilizes two C shaped ferrite cores butted together to form a closed magnetic loop with primary and secondary windings spaced along the loop. Primary winding 24 consists of a dual winding on a coil tube that is bifilar wound to produce identical characteristics and maximum coupling between winding segments 24a and 24b. This primary winding is mounted on one leg of the core. The high voltage secondary winding 28 is wound on a separate coil tube and is mounted on the opposite leg of the core from the primary. By this construction, a high frequency square wave voltage, generated in primary winding 24 by the substantially instantaneous switching of transistors Q1 and Q2, is changed to a high voltage quasi-sine wave output at output terminals 30 and 32. This feature of the high impedance transformer having loosely coupled coils reduces the conducted and radiated high frequency noise on the output lines to the inert gas lamp. The lamp is utilized in conjunction with the present embodiment of the power module. For safety reasons, one end of the secondary (terminal 32) is connected to the metal chassis that surrounds the entire power module. In other words, power module 10 is placed in a metal box and the metal box is earth grounded through terminal 16 and terminal 32. All the components within the circuit are painted black and the interior of the box is painted black to fully dissipate the heat generated by the circuit components.

It should be noted that a full wave rectifier could be used rather than the half wave rectification of diode D5. A full wave rectifier would obtain more power for the output, but would dissipate more heat. In the embodiment described herein, the circuit outputs 6 Kv and 36–43 KHz. Generally, the power supply should be designed to have a switching frequency (of the power supply's output) of at least 25 Khz, and preferably at least 30 KHz.

A voltage feedback from output transformer T1 through resistors R1 and R2 to the primary of transformer T2 could be derived from taps placed on primary winding 24 of output transformer T1 or from a separate isolated winding on the primary of transformer T1. Although these options would increase the cost of the power module, they may be desired for better control of the voltage. Resistor R6 could be changed to an active element such as a transistor or integrated circuit and by applying the proper feedback from transformer T1, the power module could be made to function as a pulse width modulated power module.

The high switching frequency used by the present invention enables the use of a power supply for inert gas lamps which is substantially smaller and lighter weight than the prior art power supplies for neon lamps. In particular, by using a switching frequency of at least 30 KHz, and loosely coupled output transformer with a high Q factor during open circuit conditions, the power supply can use a relatively small transformer to produce the high voltages required for initial ignition of a cold cathode inert gas lamp.

Signwriter Feature. A surprising benefit of the circuit arrangement used in the present invention is that it enables ignition or activation of the inert gas in the lamp with a relatively low input voltage, and complete control over the portion of the lamp or bulb which is activated or lit. By varying the input voltage into the power supply, the portion of the bulb which is lit can be smoothly and controllably varied from zero to 100 percent of the bulb—creating the visual effect that activated gas is flowing through the lamp.

Figure 7:
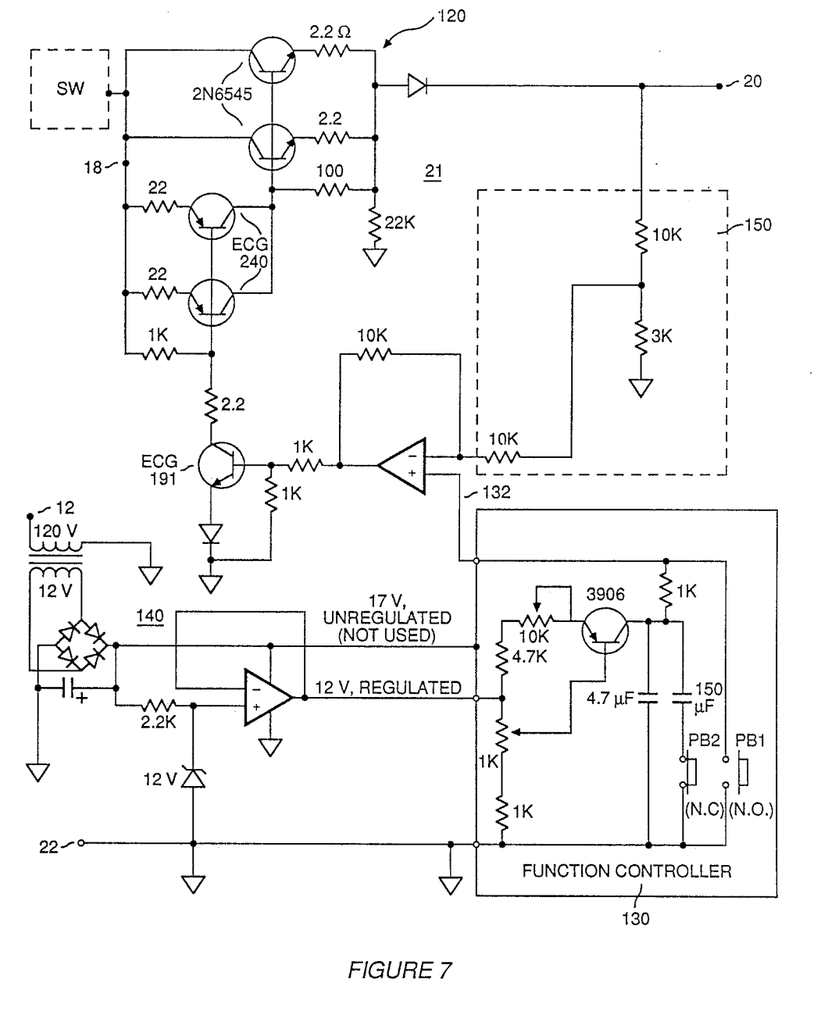
FIG. 7 shows the schematic of a control module, for use in the power supply circuit of FIG. 1, which smoothly and controllably varies the portion of a lamp which is lit from zero to 100 percent of the length of the lamp.

Referring to FIG. 7, the preferred controller 21 has four major component groups: a power attenuator 120 which passes a portion of the power available from the AC power source to node 20 (see FIG. 1), a function controller 130 which outputs a control signal on line 132 that determines the amount of power to be passed by the attenuator 120, a regulated power source 140 used to generate a reference voltage for use by the function controller, and a feedback loop 150 used for standard feedback control by the power attenuator 120.

The preferred embodiment of the function controller 130, shown in FIG. 7, is a fairly simple ramp generator with a selectable time constant. When activated, by pushing restart push button PB1, the function controller generates a ramp signal waveform on the control line 132. As a result, the output of the attenuator 120 rises proportionately. Thus pushing PB1 causes the output of the power supply 10 to drop to a low voltage level, and to then generate the ramp signal waveform on control line 132.

Push button PB2 (normally closed) can be used to remove the 150 microfarad capacitor from the operation of the function controller circuit 130 shown in FIG. 7, thereby increasing the slope of the ramp signal waveform on the control line 132, and increasing the rate at which the bulb 25 is lit.

Now referring to FIG. 1, assuming that the bulb 25 is a long neon bulb (e.g., a sixteen foot long bulb used in a sign), the power supply 10 will operate as follows. When power is first turned on (using switch SW), or the restart push button PB1 in the function controller is pushed, the neon bulb 25 is initially unlit. As the output of the function controller 130 rises to the point that the power attenuator 120 passes approximately 20 percent of the rated input voltage, the output transformer T1 will develop enough voltage to activate the bulb 25. However, when the bulb's neon gas is activated, the impedance of the bulb drops sharply, and the output of the loosely coupled output transformer T1 will also drop to maintain the proper voltage for this operating condition. With an input voltage on node 20 of only 20 percent of the rated input voltage, just a small percentage of the bulb will be lit. In other words, only the gas close to the bulb's contacts at one end of the bulb will be activated at this input voltage.

The use of a transformer T1 with a high Q factor (approximately 2.8 in the preferred embodiment) for open circuit conditions, with loose coupling between the primary and secondary windings enable the output transformer T1 to develop a high ignition voltage with relatively low input voltage, and to then automatically back off to a lower output voltage once ignition has occurred.

As the output of the function controller 130 rises, the output of the power attenuator onto node 20 will rise, the output voltage on the secondary of the output transformer T1 will rise, and therefore an increasing portion of the bulb 25 will be lit until the entire bulb is lit.

As will be understood by those skilled in the art, in other embodiments of the invention, the function controller 130 in FIG. 7 could be replaced with any of a wide variety of pattern generators for generating a control signal on line 132. The portion of the bulb 25 which is lit at any particular time will correspond to the level of the control signal generated by the function generator.

In particular, the inventor anticipates that fully automatic function controllers will be used with the invention, with each automatic function controller repetitively generating a specified control signal pattern on line 132 so that the portion of the bulb 25 which is lit will follow a corresponding pattern.

While the present invention has been described with reference to a few specific embodiments, the description is illustrative of the invention and is no to be construed as limiting the invention. Various modifications may occur to those skilled in the art without departing from the true spirit and scope of the invention as defined by the appended claims.

What is claimed:

1. A power supply for powering an inert gas lamp, comprising:
   conversion means, coupled to an a.c. power supply, for generating substantially d.c. output;
   transformation means, having an input coupled to said conversion means and an output to be coupled to an inert gas lamp, for providing a high frequency a.c. voltage to an inert gas lamp; said transformation means including an output transformer having a primary winding and a secondary winding loosely coupled to one another, said primary winding having a center tap coupled to said d.c. output of said conversion means, and switching means coupled to said d.c. output of said conversion means for supplying an alternating current to said primary winding of said output transformer; and
   d.c. amplitude control means for coupling said conversion means to said transformation means, including controlled attenuator means for changing the amount of power passed to said transformation means, so that the portion of an inert gas lamp coupled to said secondary winding of said output transformer which is lit can be smoothly and continuously varied from zero to 100 percent.

2. The power supply of claim 1, wherein secondary winding of said output transformer is wound in a lattice pattern and is comprised of at least one pi winding, and said output transformer has a high Q factor which facilitates initial activation of an inert gas lamp.

3. The power supply of claim 1, wherein said d.c. amplitude control means includes function means for changing the amount of power passed to said transformation means in accordance with a predefined pattern, thereby causing the portion of the inert gas lamp activated by said transformation means to change over time in accordance with said predefined pattern.

4. The power supply of claim 1, wherein
   said primary winding of said output transformer is bifilar wound, and
   said switching means is comprised of first and second NPN switching devices each having a collector connected respectively to opposite ends of said primary winding, each said switching device having a base and a PN base-collector junction, said base a.c. coupled to said center tap of said primary winding so that when the corresponding end of said primary winding is inductively driven to a voltage more negative than the voltage on said switching device's base, said PN base-collector junction clamps the voltage on said end of said primary winding and resets said output transformer;
   whereby said switching means is connected to said output transformer so as to automatically reset said output transformer after each half cycle of said switching means, thereby preventing saturation of said output transformer.

5. The power supply of claim 4, wherein secondary winding of said output transformer is wound in a universal or lattice pattern and is comprised of at least one pi winding, and said output transformer has a high Q factor which facilitates initial activation of an inert gas lamp.

6. A power supply for powering an inert gas lamp, comprising:
   conversion means, coupled to an a.c. power supply, for generating substantially d.c. output;
   transformation means, having an input coupled to said conversion means and an output to be coupled to an inert gas lamp, for providing a high frequency a.c. voltage to an inert gas lamp; said transformation means including an output transformer having a primary winding and a secondary winding loosely coupled to one another, said primary winding having a center tap coupled to said d.c. output of said conversion means, and switching means coupled to said d.c. output of said conversion means for supplying an alternating current to said primary winding of said output transformer;
   said switching means including first and second NPN switching devices each having a collector connected respectively to opposite ends of said primary winding, each said switching device having a base and a PN base-collector junction, and means for a.c. coupling said base of each switching device to said center tap of said primary winding so that when the corresponding end of said primary winding is inductively driven to a voltage more negative than the voltage on said switching device's base, said PN base-collector junction clamps the voltage on said end of said primary winding and resets said output transformer;
   whereby said switching means is connected to said output transformer so as to automatically reset said output transformer after each half cycle of said switching means.

7. The power supply of claim 6, wherein said primary winding of said output transformer is bifilar wound, said secondary winding of said output transformer is wound in a universal or lattice pattern and is comprised of at least one pi winding, and said output transformer has a high Q factor which facilitates initial activation of an inert gas lamp.

8. The power supply of claim 6, including feedback means coupled to said secondary winding of said output transformer for sensing the voltage on said second winding and for adjusting the operation of said switching means so as to protect said power supply from generating excessive output voltages.

9. The power supply of claim 6, including
   d.c. amplitude control means for coupling said conversion means to said transformation means, including controlled attenuator means for changing the amount of power passed to said transformation means so that the portion of an inert gas lamp coupled to said secondary winding of said output transformer which is lit can be smoothly and continuously varied from zero to 100 percent.

10. The power supply of claim 9, wherein said d.c. amplitude control means includes function means for changing the amount of power passed to said transformation means in accordance with a predefined pattern, thereby causing the portion of the inert gas lamp activated by said transformation means to change over time in accordance with said predefined pattern.

* * * * *